United States Patent
Zhu et al.

(10) Patent No.: US 12,303,828 B2
(45) Date of Patent: May 20, 2025

(54) DEVICE SYSTEM AND METHOD HAVING SINTERING FLUE GAS CO CATALYTIC HEAT EXCHANGE AND MEDIUM-AND-LOW-TEMPERATURE SCR DENITRATION CONNECTED IN SERIES

(71) Applicant: Institute of Process Engineering, Chinese Academy of Sciences, Beijing (CN)

(72) Inventors: Tingyu Zhu, Beijing (CN); Xiaolong Liu, Beijing (CN); Yang Zou, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/730,414

(22) PCT Filed: Aug. 8, 2022

(86) PCT No.: PCT/CN2022/110880
§ 371 (c)(1),
(2) Date: Jul. 19, 2024

(87) PCT Pub. No.: WO2023/231175
PCT Pub. Date: Dec. 7, 2023

(65) Prior Publication Data
US 2024/0416276 A1    Dec. 19, 2024

(30) Foreign Application Priority Data

May 30, 2022   (CN) .......................... 202210603539.0

(51) Int. Cl.
*B01D 53/34*    (2006.01)
*B01D 53/86*    (2006.01)
(Continued)

(52) U.S. Cl.
CPC ....... *B01D 53/343* (2013.01); *B01D 53/8628* (2013.01); *B01D 53/864* (2013.01);
(Continued)

(58) Field of Classification Search
None
See application file for complete search history.

(56) References Cited

U.S. PATENT DOCUMENTS 3,607,133 A * 9/1971 Hirao ...................... B01D 53/62
60/299
5,589,142 A * 12/1996 Gribbon .................... F23G 7/07
110/211
(Continued)

FOREIGN PATENT DOCUMENTS

| CN | 205606599 | | 9/2016 |
| CN | 206082117 | * | 4/2017 |

(Continued)

OTHER PUBLICATIONS

International Search Report in related matter PCT/CN2022/110880 mailed Feb. 27, 2023.
(Continued)

*Primary Examiner* — Sheng H Davis
(74) *Attorney, Agent, or Firm* — Woodard, Emhardt, Henry, Reeves & Wagner, LLP

(57) ABSTRACT

Disclosed in the present invention are a device system and method having sintering flue gas CO catalytic heat exchange and medium-and-low-temperature SCR denitration connected in series. In the device system, a CO catalytic heat storage and exchange device is arranged to completely replace an original heat exchanger arranged after a raw desulfurized flue gas pipe. The method comprises respectively carrying out first CO catalytic conversion and second CO catalytic conversion on sintering flue gas and denitrated
(Continued)

flue gas by means of the CO catalytic heat storage and exchange device, thereby increasing CO conversion efficiency and reducing overall resistance of the system. In addition, the present invention takes both CO pollution control and carbon emission reduction into consideration and thus has good economic benefits and a good application prospect.

8 Claims, 1 Drawing Sheet

(51) Int. Cl.
  *B01J 21/06* (2006.01)
  *B01J 21/16* (2006.01)
  *B01J 23/30* (2006.01)
  *B01J 35/57* (2024.01)

(52) U.S. Cl.
  CPC ....... *B01D 53/8656* (2013.01); *B01D 53/869* (2013.01); *B01J 21/063* (2013.01); *B01J 21/16* (2013.01); *B01J 23/30* (2013.01); *B01J 35/57* (2024.01); *B01D 2251/2062* (2013.01); *B01D 2255/20707* (2013.01); *B01D 2255/20723* (2013.01); *B01D 2255/20769* (2013.01); *B01D 2255/20776* (2013.01); *B01D 2255/40* (2013.01); *B01D 2255/9205* (2013.01); *B01D 2257/404* (2013.01); *B01D 2257/502* (2013.01); *B01D 2258/0283* (2013.01); *B01D 2259/124* (2013.01); *B01D 2259/65* (2013.01)

(56) References Cited

U.S. PATENT DOCUMENTS

| | | | | | |
|---|---|---|---|---|---|
| 5,837,205 | A | * | 11/1998 | Bayer | B01D 53/72 |
| | | | | | 431/170 |
| 2009/0062593 | A1 | * | 3/2009 | Bruno | B01D 53/1475 |
| | | | | | 588/250 |

FOREIGN PATENT DOCUMENTS

| | | | |
|---|---|---|---|
| CN | 107597095 | | 1/2018 |
| CN | 108568210 | | 9/2018 |
| CN | 109482052 | | 3/2019 |
| CN | 109529918 | * | 3/2019 |
| CN | 209165429 | | 7/2019 |
| CN | 110621399 | * | 12/2019 |
| CN | 111569867 | * | 8/2020 |
| CN | 111578298 | | 8/2020 |
| CN | 111821852 | | 10/2020 |
| CN | 112403258 | | 2/2021 |
| CN | 113117486 | * | 7/2021 |
| CN | 214319745 | | 10/2021 |
| CN | 113813777 | * | 12/2021 |
| CN | 114797463 | | 7/2022 |
| JP | S61157332 | | 7/1986 |
| JP | H0439369 | | 6/1992 |
| TW | 201924769 | | 7/2019 |
| WO | 2020113662 | * | 6/2020 |

OTHER PUBLICATIONS

Office Action in related CN202210603539.0 mailed Jun. 29, 2023.
Office Action in related CN202210603539.0 mailed Nov. 28, 2022.

* cited by examiner

DEVICE SYSTEM AND METHOD HAVING SINTERING FLUE GAS CO CATALYTIC HEAT EXCHANGE AND MEDIUM-AND-LOW-TEMPERATURE SCR DENITRATION CONNECTED IN SERIES

TECHNICAL FIELD

Embodiments of the present application relate to the field of pollutant control technology, such as a device system and a method for sintering flue gas having CO catalytic heat exchange in series with medium/low-temperature SCR denitration.

BACKGROUND

For the treatment of steel flue gas pollutants, the control technology of nitrogen oxides in sintering flue gas has received special attention. In the prior desulfurization and denitration technologies of the sintering flue gas, the technology combination of semi-dry desulfurization and medium/low-temperature SCR denitration is the mainstream purification process. The reaction temperature of medium/low-temperature SCR denitration is within 220-280° C., while the temperature of the flue gas after the semi-dry desulfurization is only within 80-120° C. The flue gas needs to be reheated to reach the denitration reaction temperature.

In the medium/low-temperature SCR denitration process, the sintering flue gas after semi-dry desulfurization is subjected to heat exchange with the denitrated purified flue gas, and then is subjected to heat compensation from fuel combustion in the hot blast furnace to reach the medium/low-temperature SCR denitration reaction temperature. Such a process has a large pressure drop during heat exchange, a high cost of fuel heat compensation, and will cause an increase in carbon emissions. It is worth noting that the sintering flue gas contains 0.5-1% of CO, which is rich in chemical energy and can release a large amount of heat when oxidized to $CO_2$ to raise the temperature of the flue gas. It has been shown by calculation that the complete oxidation of 0.48% of CO to $CO_2$ can increase the temperature of the flue gas by 45° C. If CO catalytic oxidation is used to replace the fuel heat compensation, not only the purpose of pollution reduction can be achieved, but also the effect of carbon reduction can be achieved.

Therefore, it is of great significance to develop a technology to use CO in flue gas for heat compensation for the medium/low-temperature SCR denitration.

CN212236736U discloses a combined removal device for carbon monoxide and nitrogen oxides in sintering flue gas, the device is sequentially equipped with a heating system, a carbon monoxide catalytic reaction system, an ammonia spray system, and a low-temperature SCR denitration reaction system along the flow direction of the flue gas, and the carbon monoxide catalytic reaction system is arranged at the flue gas outlet-side of the heating system. The device uses the heat released in the reaction process of CO to generate $CO_2$ to raise the temperature of the sintering flue gas by about 15-75° C. Although the device saves fuel and treats carbon monoxide in the flue gas, the CO catalyzed reaction system also increases the operating resistance of the device and increases the system pressure drop.

In addition, CO has a reducing property. CN212999279U discloses a flue gas treatment system for efficient utilization of CO, which comprises a desulfurization device, a dust removal device, a flue gas flow-splitting device, a catalytic oxidation device, a flue gas flow-mixing device, and a catalytic reduction device. In the system, a part of the carbon monoxide in the flue gas after desulfurization and dust removal is converted into carbon dioxide by catalytic oxidation first, and then mixed with the remaining flue gas and subjected to CO catalytic reduction and denitration. At the same time, the heat released from the CO catalytic oxidation process is directly used in the denitration process, reducing or even avoiding the process of heating the flue gas with external fuel, which saves energy and replaces the use of the reducing agent $NH_3$ in the conventional SCR denitration process. However, when the CO concentration in the sintering flue gas is low, the heat released from the CO oxidation after flow-splitting is not enough to heat the flue gas to the denitration reaction temperature. In addition, the technology of reducing nitrogen oxides with CO is still immature, and the corresponding catalyst still needs to be developed.

In summary, it is necessary to develop a device system and a method with low system resistance and high CO conversion rate which uses the heat released from CO catalysis for medium/low-temperature SCR denitration.

SUMMARY

The following is a summary of the subject described in detail herein. This summary is not intended to limit the protection scope of the claims.

In view of the problems in the prior medium/low-temperature SCR denitration of the sintering flue gas, such as high heat-compensation cost, high carbon emission, a high CO emission concentration of the sintering flue gas, and high system resistance caused by the direct addition of the CO catalytic oxidation device, embodiments of the present application provide a device system and a method for sintering flue gas having CO catalytic heat exchange in series with medium/low-temperature SCR denitration. The sintering flue gas is subjected to heat exchange and heating by adopting the CO catalytic regenerative heat exchange device which uses the heat storage performance and catalytic performance of the CO heat-regenerative catalyst combined with a heat exchange element and, which effectively reduces the usage amount of heat exchange elements and reduces the overall system resistance, and meanwhile, the sintering flue gas and the purified flue gas both have to pass through the CO heat-regenerative catalyst, which improves the CO conversion efficiency, and has a good economic benefit and application prospect.

In a first aspect, an embodiment of the present application provides a device system for sintering flue gas having CO catalytic heat exchange in series with medium/low-temperature SCR denitration, and the device system comprises: a CO catalytic regenerative heat exchange device, an ammonia spray device, and a medium/low-temperature SCR denitration reaction device which are sequentially connected along the flow direction of raw flue gas; a sintering flue gas inlet of the CO catalytic regenerative heat exchange device is directly connected to a desulfurized raw flue gas pipeline; a purified flue gas outlet of the medium/low-temperature SCR denitration reaction device is connected to a denitrated flue gas inlet of the CO catalytic regenerative heat exchange device.

The prior medium/low-temperature SCR denitration process for sintering flue gas mostly uses blast furnace gas to compensate heat, and the desulfurized sintering flue gas exchanges heat with the denitrated purified flue gas in the heat exchanger, and then introduced into the hot blast furnace where the blast furnace gas is combusted to heat the raw flue gas to the reaction temperature of low/medium-temperature SCR denitration. The blast furnace gas contains about 20% of $CO_2$, and the use of the blast furnace gas to heat the raw flue gas not only increases the carbon emission, but also increases the operation cost of the flue gas denitration. However, if the CO catalytic oxidation device is simply added between the heat exchanger and the hot blast furnace or between the hot blast furnace and the SCR denitration reaction reactor, the overall system resistance will be further increased, increasing the operation cost.

For the device system provided in the present application, the CO catalytic regenerative heat exchange device is directly connected to the pipeline of the raw flue gas after dry desulfurization, and no heat exchanger is provided, the CO catalytic regenerative heat exchange device is directly used to replace the heat exchanger, which effectively reduces the usage amount of heat exchange elements, and avoids using the blast furnace gas during the stable system operation; meanwhile, the sintering flue gas and the denitrated flue gas both realize the heat storage and conversion by the CO catalytic regenerative heat exchange device, improving the conversion rate of CO, and ensuring the temperature of the flue gas introduced into the medium/low-temperature SCR denitration reaction device reaches the set level, which significantly reduces the pressure drop compared with directly connecting the CO catalytic oxidation device in series with the heat exchanger, and can make full use of the energy of CO catalytic oxidation compared with the use of the heat exchanger only. Therefore, the device system provided in the present application can achieve stable operation with high efficiency and low cost, and has strong applicability to the sintering flue gas.

Preferably, the CO catalytic regenerative heat exchange device comprises a heat exchange device shell, and a CO heat-regenerative catalyst and a heat exchange element which are provided inside the heat exchange device shell.

In the present application, a pressure drop of the heat exchange element is about 1000-1200 Pa (450-550 Pa on the raw flue gas side+550-650 Pa on the purified flue gas side), a pressure drop of the CO heat-regenerative catalyst is about 550-650 Pa, totaling 1550-1850 Pa; compared with a pressure drop of about 2200-2400 Pa (750-800 Pa on the raw flue gas side+900-950 Pa on the purified flue gas side+550-650 Pa on the CO catalytic oxidation device) in the case where the CO catalytic oxidation device is added conventionally and directly on the basis of the heat exchanger, the pressure drop has decreased by about 22-30% (the pressure drop data is estimated based on the flow rate of the sintering flue gas of about 850000 $Nm^3/h$), which can be, for example, 22%, 23%, 24%, 25%, 26%, 28%, 29%, or 30%.

A guide bearing inside a central axis of the CO catalytic regenerative heat exchange device, and the CO heat-regenerative catalyst and the heat exchange element can rotate around the guide bearing.

Preferably, the CO catalytic regenerative heat exchange device is further provided with a turnplate, the turnplate can rotate around the guide bearing, and the CO heat-regenerative catalyst and the heat exchange element are arranged inside the turnplate.

When the turnplate rotates around the guide bearing, the CO heat-regenerative catalyst and the heat exchanger element rotate with the turnplate around the guide bearing simultaneously because they are fixed inside the turnplate.

Preferably, the heat exchange element is arranged lower than the CO heat-regenerative catalyst.

Preferably, the CO heat-regenerative catalyst comprises a cordierite honeycomb ceramic heat-regenerative framework and an active component which is arranged on the cordierite honeycomb ceramic heat-regenerative framework.

In the present application, the cordierite honeycomb ceramic heat-regenerative framework is selected as the CO heat-regenerative catalyst, because it is a monolithic catalyst with good heat-storage performance and lightweight, and can improve heat exchange efficiency and reduce the energy consumption of rotation.

Preferably, the usage amount of the catalyst and the usage amount of the heat exchange element can be adjusted in a coordinated way, that is, the volume of the CO heat-regenerative catalyst and the heat exchange area of the heat exchange element can be adjusted, the volume of CO heat-regenerative catalyst is about 85-170 $m^3$, the heat exchange area of the heat exchange element on the raw flue gas side is about 20000-40000 $m^2$, and the heat exchange area of the heat exchange element on the purified flue gas side is about 30000-60000 $m^2$ (estimated based on the flow rate of the sintering flue gas of about 850000 $Nm^3/h$).

Preferably, a porosity of the cordierite honeycomb ceramic heat-regenerative framework is 0.5-0.7, which can be, for example, 0.5, 0.52, 0.53, 0.54, 0.55, 0.56, 0.58, 0.6, 0.62, 0.65, 0.68, or 0.7, but the porosity is not limited to the listed values, and other unlisted values within the numerical range are also applicable.

Preferably, a size of the catalyst is 90-110 mm×90-110 mm×30-50 mm, which can be, for example, 90 mm×90 mm×30 mm, 100 mm×90 mm×40 mm, 110 mm×110 mm×50 mm, 90 mm×90 mm×50 mm, or 95 mm×90 mm×40 mm, but the size is not limited to the listed values, and other unlisted values within the numerical range are also applicable.

Preferably, the active component is precious metal platinum.

Preferably, the heat exchange element has a corrugated structure.

Preferably, the heat exchange element has a hot-side material of SPCC (cold-reduced carbon steel sheet and strip of commercial qualities), and a cold-side material of enamel or corrosion-resistant steel.

Preferably, a radial sealing sheet and an axial sealing sheet for sequestering the sintering flue gas and the denitrated flue gas from each other are arranged inside the turnplate of the CO catalytic regenerative heat exchange device.

Preferably, an SCR denitration catalyst is arranged in the medium/low-temperature SCR denitration reaction device.

Preferably, a hot blast furnace device is further arranged between the CO catalytic regenerative heat exchange device and the ammonia spray device, or a hot blast furnace device is arranged before the CO catalytic regenerative heat exchange device.

In the present application, the hot blast furnace device is preferably arranged between the CO catalytic regenerative heat exchange device and the ammonia spray device, which is more conducive to the temperature regulation and heat compensation of the flue gas passed through the CO catalytic regenerative heat exchange device.

In a second aspect, an embodiment of the present application provides a method for sintering flue gas having CO catalytic heat exchange in series with medium/low-temperature SCR denitration, and the method comprises the following steps:
(1) subjecting sintering flue gas to a CO catalytic regenerative heat exchange device to perform a first CO catalytic conversion and heat the sintering flue gas to obtain heated flue gas;

(2) mixing the heated flue gas with an ammonia source by an ammonia spray device, and then introducing into a medium/low-temperature SCR denitration reaction device to perform an SCR denitration reaction to obtain denitrated flue gas; and (3) introducing the denitrated flue gas into the CO catalytic regenerative heat exchange device to perform heat exchange cooling and a second CO catalytic conversion to obtain the purified sintering flue gas.

During the stable operation stage of the method in the present application, additional heat compensation by fuel is not required, the heat of CO catalytic oxidation and the preheating of the flue gas after SCR denitration can be directly used to heat the desulfurized flue gas to reach the temperature required for SCR denitration, so that the heat can be saved while the problem of increased pressure drop caused by connecting the heat exchanger in series with the CO catalytic oxidation device can be avoided.

Preferably, after a cycle of step (1) to step (3), the CO heat-regenerative catalyst and the heat exchange element that store heat are transferred around the guide bearing to the sintering flue gas side, that is, cycling back to step (1), the CO heat-regenerative catalyst and the heat exchange element release heat to raise the temperature of the sintering flue gas. Preferably, when the method in step (1) is started, the heated flue gas is first compensated in heat by the hot blast furnace device, and then introduced to the ammonia spray device.

In the present application, when the system device is started, there is no heat storage in the CO catalytic regenerative heat exchange device, so the heat compensation from the hot blast furnace device is required to realize the temperature of SCR denitration. However, when the system device is running stably, the heat of the denitrated flue gas is stored in the CO heat-regenerative catalyst and the heat exchange element by the CO catalytic regenerative heat exchange device to transfer to the sintering flue gas, in which case, the fuel feed can be stopped, the hot blast furnace device can be shut down, and the heat of CO catalytic oxidation and the heat storage of the flue gas after SCR denitration can be used to heat the sintering flue gas.

Preferably, a fuel of the hot blast furnace is selected from a gaseous fuel, such as natural gas, blast furnace gas, or coke oven gas, but the gaseous fuel is not limited to the listed gaseous fuels, and other unlisted gaseous fuels are also applicable, and to avoid the introduction of other pollutants such as dust, preferably, the gaseous fuel is blast furnace gas.

Preferably, a CO concentration in the sintering flue gas is 6000-12000 mg/Nm$^3$, which can be, for example, 6000 mg/Nm$^3$, 7000 mg/Nm$^3$, 7500 mg/Nm$^3$, 8000 mg/Nm$^3$, 8500 mg/Nm$^3$, 9000 mg/Nm$^3$, 9500 mg/Nm$^3$, 10000 mg/Nm$^3$, 11000 mg/Nm$^3$, or 12000 mg/Nm$^3$, but the CO concentration is not limited to the listed values, and other unlisted values within the numerical range are also applicable, and preferably, the CO concentration is 8000-12000 mg/Nm$^3$.

Preferably, by the first CO catalytic conversion and the second CO catalytic conversion, a temperature of the sintering flue gas can be increased by 20-90° C., such as 20° C., 35° C., 50° C., 65° C., 80° C., or 90° C., but the temperature is not limited to the listed values, and other unlisted values within the numerical range are also applicable.

Preferably, a temperature of the sintering flue gas is 50-130° C., such as 50° C., 55° C., 65° C., 70° C., 80° C., 85° C., 95° C., 100° C., 105° C., 110° C., or 130° C., but the temperature is not limited to the listed values, and other unlisted values within the numerical range are also applicable.

Preferably, a NO$_x$ concentration in the sintering flue gas in step (1) is 200-400 mg/Nm$^3$, such as 200 mg/Nm$^3$, 240 mg/Nm$^3$, 280 mg/Nm$^3$, 320 mg/Nm$^3$, 360 mg/Nm$^3$, or 400 mg/Nm$^3$, but the NO$_x$ concentration is not limited to the listed values, and other unlisted values within the numerical range are also applicable.

Preferably, a SO$_2$ concentration in the sintering flue gas in step (1) is 0-35 mg/Nm$^3$, such as 0 mg/Nm$^3$, 5 mg/Nm$^3$, 10 mg/Nm$^3$, 15 mg/Nm$^3$, 20 mg/Nm$^3$, 25 mg/Nm$^3$, or 35 mg/Nm$^3$, but the SO$_2$ concentration is not limited to the listed values, and other unlisted values within the numerical range are also applicable.

Preferably, a particulate matter concentration in the sintering flue gas in step (1) is 0-10 mg/Nm$^3$, such as 0 mg/Nm$^3$, 2 mg/Nm$^3$, 4 mg/Nm$^3$, 6 mg/Nm$^3$, 8 mg/Nm$^3$, or 10 mg/Nm$^3$, but the particulate matter concentration is not limited to the listed values, and other unlisted values within the numerical range are also applicable.

Preferably, a temperature of the heated flue gas which is introduced into the ammonia spray device in step (2) is 220-280° C., which can be, for example, 220° C., 225° C., 230° C., 235° C., 240° C., 245° C., 250° C., 255° C., 260° C., 265° C., 270° C., or 280° C., but the temperature is not limited to the listed values, and other unlisted values within the numerical range are also applicable; preferably, the temperature is 260-280° C.

Preferably, the ammonia source comprises any one or a combination of at least two of aqueous ammonia, urea, or liquid ammonia, and a typical but non-limiting example of the combination comprises: a combination of aqueous ammonia and urea, a combination of urea and liquid ammonia, and a combination of aqueous ammonia, urea, and liquid ammonia, etc.

Preferably, the temperature of the flue gas has no significant change during the SCR denitration reaction. The non-significant change means that the temperature difference between the inlet and outlet flue gas of the medium/low-temperature SCR denitration reaction device is within 10° C.

CO is rich in chemical energy, and the heat released from the complete catalytic oxidation of 6000 mg/Nm$^3$ of CO can increase the temperature of flue gas by 45° C. In the prior medium/low-temperature SCR denitration process, the hot blast furnace is required to provide heat compensation by 20-60° C., and if the CO in the flue gas is subjected to catalytic oxidation, the reaction heat released can replace the heat compensation from the fuel of the hot blast furnace.

Preferably, a catalyst for the SCR denitration reaction in step (2) comprises a vanadium-tungsten-titanium catalyst and/or a vanadium-molybdenum-titanium catalyst, preferably, $V_2O_5$—$WO_3/TiO_2$ and/or $V_2O_5$—$MoO_3/TiO_2$.

Under the action of the denitration catalyst, NO$_x$ in the flue gas reacts with a reducing agent to generate N$_2$, and the heated flue gas becomes the denitrated flue gas, and the temperature of the flue gas has no significant change during the denitration process.

Preferably, a complete reaction temperature of the CO heat-regenerative catalyst in the CO catalytic regenerative device is 180-220° C., which can be, for example, 180° C., 185° C., 190° C., 195° C., 200° C., 205° C., 210° C., or 220° C., but the complete reaction temperature is not limited to the listed values, and other unlisted values within the numerical range are also applicable.

Compared with the related art, the embodiments of the present application at least have the following beneficial effects.

(1) For the device system for sintering flue gas having CO catalytic heat exchange in series with medium/low-temperature SCR denitration provided by the embodiments of the present application, the heat released from the CO catalytic oxidation is used to replace the heat compensation of the hot blast furnace fuel and the heat exchanger device, greatly reducing the use of fuel, reducing the carbon emission and the operation cost of the denitration system, and giving attention to the removal of unconventional pollutant CO, which has strong economy and applicability for the medium/low-temperature SCR denitration process.

(2) In the method for sintering flue gas having CO catalytic heat exchange in series with medium/low-temperature SCR denitration provided by the embodiments of the present application, the problems of high system resistance and large energy consumption in the prior art are overcome, the heat storage performance of the CO heat-regenerative catalyst is fully utilized, and the usage amount of the heat exchange element is effectively reduced, reducing the system operation resistance, and the pressure drop is reduced by about 22-30%. For the flue gas with a flow rate of 850000 $Nm^3/h$, under optimal conditions, the total system pressure drop is only less than or equal to 1900 Pa; the consumption of blast furnace gas is low, which is less than or equal to 50000 $m^3$ in 30 days; the result of denitration and CO removal is excellent, wherein the $NO_x$ concentration in the purified flue gas is less than or equal to 40 $mg/m^3$, and the CO concentration in the purified flue gas is less than or equal to 500 $mg/m^3$. The method provides a guarantee for efficient catalytic oxidation and heat exchange, and has good economic benefits and application prospects.

Other aspects will be appreciated upon reading and understanding the detailed description and accompanying drawings.

BRIEF DESCRIPTION OF DRAWINGS

The accompanying drawings are used to provide a further understanding of the technical solutions herein, and form a part of the specification, which are used together with embodiments of the present application to explain the technical solutions herein, and do not constitute a limitation on the technical solutions herein.

Figure 1:
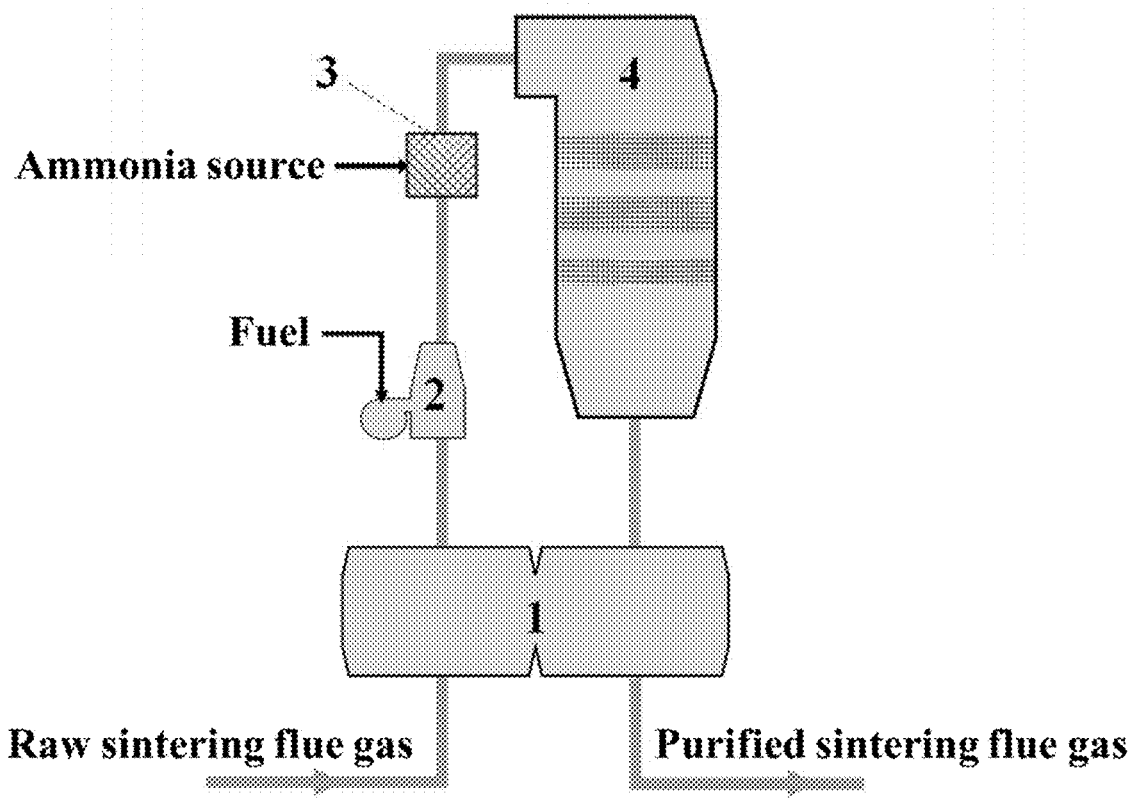
FIG. 1 is a drawing showing a device system for sintering flue gas having CO catalytic heat exchange in series with medium/low-temperature SCR denitration provided by specific embodiments.

Reference list: 1—CO catalytic regenerative heat exchange device; 2—hot blast furnace device; 3—ammonia spray device; 4—low/medium-temperature SCR denitration reaction device; 5—shell; 6—CO heat-regenerative catalyst; 7—heat exchange element; and 8—guide bearing.

DETAILED DESCRIPTION

The technical solutions of the present application are further explained with reference to the accompanying drawings and embodiments.

The present application is described in further detail below. However, the following examples are only simple examples of the present application and do not represent or limit the protection scope of the present application, and the protection scope of the present application is subject to the claims.

It should be understood that in the description of the present application, the orientation or position relationship indicated by the terms, such as "center", "longitudinal", "lateral", "up", "down", "front", "back", "left", "right", "vertical", "horizontal", "top", "bottom", "inside", "outside", etc., is based on the orientation or position relationship shown in the drawings, which is only intended to facilitate the description of the present application and to simplify the description, but not to indicate or imply that the device or element referred to must have a particular orientation or must be constructed and operated in a specific orientation, and therefore cannot be regarded as a limitation of the present application. In addition, terms such as "first" and "second" are used only for descriptive purposes and cannot be understood as indicating or implying relative importance or implicitly specifying the number of technical features referred to. Thus, features defined by "first" and "second" can explicitly or implicitly comprise one or more of the features. In the description of the present application, unless otherwise stated, "a plurality of" means two or more.

It should be noted that in the description of the present application, unless otherwise specified or limited, the terms such as "arrange", "attach", and "connect" are to be understood in a broad sense, for example, as a fixed connection, or as a detachable connection, or as an integrated connection; as a mechanical connection, or as an electrical connection; as a direct connection, or as an indirect connection via an intermediate medium, or as a communication between two elements. For those skilled in the field, the specific meaning of the above terms in the present application can be understood in the light of specific cases.

Those skilled in the art should understand that in the present application, the necessary pipelines, regular valves, and general pumps required to complete the process are necessarily comprised, but the above contents do not belong to the main application ideas of the present application, and those skilled in the art may add additional arrangements based on the process flow and equipment structure selection, and there are no special requirements or specific restrictions on this aspect in the present application.

Figure 2:
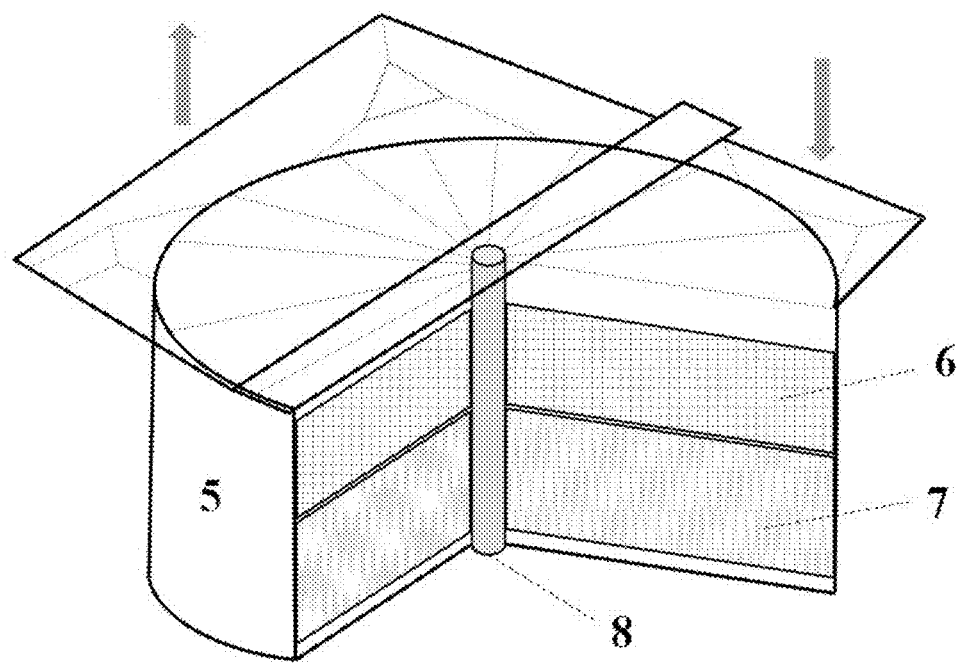
FIG. 2 is a detailed drawing showing the CO catalytic regenerative device in FIG. 1.

As a specific embodiment of the present application, a device system for sintering flue gas having CO catalytic heat exchange in series with medium/low-temperature SCR denitration is provided, as shown in FIG. 1 and FIG. 2. The device system comprises: a CO catalytic regenerative heat exchange device 1, an ammonia spray device 3, and a medium/low-temperature SCR denitration reaction device 4 which are sequentially connected along the flow direction of raw flue gas; a sintering flue gas inlet of the CO catalytic regenerative heat exchange device 1 is directly connected to a desulfurized raw flue gas pipeline; a purified flue gas outlet of the medium/low-temperature SCR denitration reaction device 4 is connected to a denitrated flue gas inlet of the CO catalytic regenerative heat exchange device 1.

The CO catalytic regenerative heat exchange device 1 comprises a heat exchange device shell 5, and a CO heat-regenerative catalyst 6 and a heat exchange element 7 which are provided inside the heat exchange device shell 5. A guide bearing 8 inside a central axis of the CO catalytic regenerative heat exchange device 1, and the CO heat-regenerative catalyst 6 and the heat exchange element 7 can rotate around the guide bearing 8.

The CO catalytic regenerative heat exchange device 1 is further provided with a turnplate, the turnplate can rotate around the guide bearing 8, and the CO heat-regenerative catalyst 6 and the heat exchange element 7 are arranged inside the turnplate. When the turnplate rotates around the guide bearing 8, the CO heat-regenerative catalyst 6 and the heat exchanger element 7 can simultaneously rotate with the turnplate around the guide bearing 8 because they are fixed inside the turnplate. The heat exchange element 7 is arranged lower than the CO heat-regenerative catalyst 6.

The CO heat-regenerative catalyst 6 comprises a cordierite honeycomb ceramic heat-regenerative framework and an active component which is arranged on the cordierite honeycomb ceramic heat-regenerative framework.

A usage amount of the catalyst and a usage amount of the heat exchange element can be adjusted in a coordinated way, that is, a volume of the CO heat-regenerative catalyst and a heat exchange area of the heat exchange element can be adjusted, the volume of CO heat-regenerative catalyst is about 85-170 $m^3$, the heat exchange area of the heat exchange element on the raw flue gas side is about 20000-40000 $m^2$, and the heat exchange area of the heat exchange element on the purified flue gas side is about 30000-60000 $m^2$ (estimated based on the flow rate of the sintering flue gas of 850000 $Nm^3/h$).

A porosity of the cordierite honeycomb ceramic heat-regenerative framework is 0.5-0.7; a size of the catalyst is 90-110 mm×90-110 mm×30-50 mm; the active component comprises precious metal platinum; the heat exchange element has a corrugated structure; the heat exchange element has a hot-side material of SPCC (cold-reduced carbon steel sheet and strip of commercial qualities), and a cold-side material of enamel or corrosion-resistant steel; a radial sealing sheet and an axial sealing sheet for sequestering the sintering flue gas and the denitrated flue gas from each other are arranged inside the turnplate of the CO catalytic regenerative heat exchange device.

An SCR denitration catalyst is arranged in the medium/low-temperature SCR denitration reaction device 4.

A hot blast furnace device 2 is further arranged between the CO catalytic regenerative heat exchange device 1 and the ammonia spray device 3.

As another specific embodiment of the present application, a method for sintering flue gas having CO catalytic heat exchange in series with medium/low-temperature SCR denitration is provided, and the method comprises the following steps:

(1) sintering flue gas is subjected to a first CO catalytic conversion by the CO catalytic regenerative heat exchange device, and the sintered flue gas is heated to obtain heated flue gas;

(2) the heated flue gas is mixed with an ammonia source by an ammonia spray device, and then introduced into a medium/low-temperature SCR denitration reaction device to perform an SCR denitration reaction to obtain denitrated flue gas; and (3) the denitrated flue gas is introduced into the CO catalytic regenerative heat exchange device, and subjected to heat exchange cooling and a second CO catalytic conversion to obtain the purified sintering flue gas.

After a cycle of step (1) to step (3), the CO heat-regenerative catalyst and the heat exchange element that store heat are transferred around the guide bearing to the sintering flue gas side, that is, circling back to step (1), the CO heat-regenerative catalyst and the heat exchange element release heat to raise the temperature of the sintering flue gas.

When the process of step (1) is being started, the heated flue gas is first compensated in heat by the hot blast furnace device, and then introduced to the ammonia spray device. When the system device is running stably, the heat of the denitrated flue gas is stored in the CO heat-regenerative catalyst and the heat exchange element by the CO catalytic regenerative heat exchange device to transfer to the sintering flue gas, in which case the fuel feed can be stopped, and the hot blast furnace device can be shut down.

Typical but non-limiting examples of the present application are as follows:

Example 1

This example provides a device system for sintering flue gas having CO catalytic heat exchange in series with medium/low-temperature SCR denitration, and the device system comprised: a CO catalytic regenerative heat exchange device, an ammonia spray device, and a medium/low-temperature SCR denitration reaction device which were sequentially connected along the flow direction of raw flue gas; the sintering flue gas inlet of the CO catalytic regenerative heat exchange device was directly connected to the desulfurized raw flue gas pipeline; the purified flue gas outlet of the medium/low-temperature SCR denitration reaction device was connected to the denitrated flue gas inlet of the CO catalytic regenerative heat exchange device.

The CO catalytic regenerative heat exchange device comprised a heat exchange device shell and a CO heat-regenerative catalyst and a heat exchange element which were provided inside the heat exchange device shell. A guide bearing inside a central axis of the CO catalytic regenerative heat exchange device, and the CO heat-regenerative catalyst and the heat exchange element can rotate around the guide bearing.

The CO catalytic regenerative heat exchange device was further provided with a turnplate, the turnplate can rotate around the guide bearing, and the CO heat-regenerative catalyst and the heat exchange element were arranged inside the turnplate. When the turnplate rotates around the guide bearing, the CO heat-regenerative catalyst and the heat exchanger element can simultaneously rotate with the turnplate around the guide bearing because they are fixed inside the turnplate. The heat exchange element was arranged lower than the CO heat-regenerative catalyst.

The CO heat-regenerative catalyst comprised a cordierite honeycomb ceramic heat-regenerative framework and an active component which was arranged on the cordierite honeycomb ceramic heat-regenerative framework.

A usage amount of the CO heat-regenerative catalyst was 85 $m^3$, a heat exchange area of the heat exchange element on the raw flue gas side was about 40000 $m^2$, and a heat exchange area of the heat exchange element on the purified flue gas side was about 60000 $m^2$ (estimated based on the flow rate of the sintering flue gas of 850000 $Nm^3/h$).

A porosity of the cordierite honeycomb ceramic heat-regenerative framework was 0.6; a size of the catalyst was 100 mm×100 mm×30 mm; the active component comprised precious metal platinum; the heat exchange element had a corrugated structure; the heat exchange element had a hot-side material of SPCC (cold-reduced carbon steel sheet and strip of commercial qualities), and a cold-side material of corrosion-resistant steel; a radial sealing sheet and an axial sealing sheet for sequestering the sintering flue gas and the denitrated flue gas from each other were are arranged inside the turnplate of the CO catalytic regenerative heat exchange device.

An SCR denitration catalyst was arranged in the medium/low-temperature SCR denitration reaction device.

A hot blast furnace device was further arranged between the CO catalytic regenerative heat exchange device and the ammonia spray device.

Example 2

This example provides a device system for sintering flue gas having CO catalytic heat exchange in series with medium/low-temperature SCR denitration, the structure of the device system refers to the structure in Example 1, and the difference was only that: the hot blast furnace device was arranged before the CO catalytic regenerative heat exchange device, i.e., the sintering flue gas inlet of the hot blast furnace device was connected to the desulfurized raw flue gas pipeline, the raw flue gas outlet of the hot blast furnace device was connected to the sintering flue gas inlet of the CO catalytic regenerative heat exchange device, and the sintering flue gas outlet of the CO catalytic regenerative heat exchange device was connected to the ammonia spray device.

Example 1 has better regulation efficiency and heat compensation efficiency on the flue gas temperature after the CO catalytic regenerative heat exchange device compared with Example 2.

Example 3

This example provides a device system for sintering flue gas having CO catalytic heat exchange in series with medium/low-temperature SCR denitration, which only differs from Example 1 in that: the usage amount of the CO heat-regenerative catalyst was 128 $m^3$, the heat exchange area of the heat exchange element on the raw flue gas side was about 26000 $m^2$, and the heat exchange area of the heat exchange element on the purified flue gas side was about 40000 $m^2$ (estimated based on the flow rate of the sintering flue gas of 850000 $Nm^3/h$).

Example 4

This example provides a device system for sintering flue gas having CO catalytic heat exchange in series with medium/low-temperature SCR denitration, which only differs from Example 1 in that: the usage amount of the CO heat-regenerative catalyst was 170 $m^3$, the heat exchange area of the heat exchange element on the raw flue gas side was about 20000 $m^2$, and the heat exchange area of the heat exchange element on the purified flue gas side was about 30000 $m^2$ (estimated based on the flow rate of the sintering flue gas of 850000 $Nm^3/h$), the porosity of the cordierite honeycomb ceramic heat-regenerative framework was 0.5, and the size of the catalyst was 100 mm×100 mm×40 mm.

Example 5

This example provides a device system for sintering flue gas having CO catalytic heat exchange in series with medium/low-temperature SCR denitration, which only differs from Example 1 in that: the porosity of the cordierite honeycomb ceramic heat-regenerative framework was 0.3.

Comparative Example 1

This comparative example provides a device system for medium/low-temperature SCR denitration. In the device system, the CO catalytic regenerative heat exchange device was not provided, and only a heat exchanger having a heat exchange element with the same structure as in Example 1 was provided. However, the heat exchange area of the heat exchange element on the raw flue gas side was about 60000 $m^2$, and the heat exchange area of the heat exchange element on the purified flue gas side was about 90000 $m^2$ (estimated based on the flow rate of the sintering flue gas of 850000 $Nm^3/h$). In addition, other components, locations, and structures were the same as those in Example 1.

Comparative Example 2

This comparative example provides a device system for medium/low-temperature SCR denitration. In the device system, the CO catalytic regenerative heat exchange device was not provided, instead, it was replaced by a heat exchanger (the structure of the heat exchange element was the same as that of Example 1, the heat exchange area of the heat exchange element on the raw flue gas side was about 40000 $m^2$, and the heat exchange area of the heat exchange element on the purified flue gas side was about 90000 $m^2$) and a CO catalytic oxidation device (the active component for CO catalytic oxidation was a precious metal platinum catalyst, a non-heat-regenerative catalyst) which were arranged in series sequentially, and the denitrated flue gas only passed through the heat exchanger, and did not pass through the CO catalytic oxidation device. In addition, other components, locations, and structures were the same as those in Example 1.

Comparative Example 3

This comparative example provides a device system for sintering flue gas having CO catalytic heat exchange in series with medium/low-temperature SCR denitration, the device system was the same as in Example 2 except that only the CO heat-regenerative catalyst was arranged (the usage amount of the CO heat-regenerative catalyst was the same as that in Example 2), the heat exchange element was not arranged, and the purified flue gas outlet of the medium/low-temperature SCR denitration reaction device was not connected with the denitrated flue gas inlet of the CO catalytic regenerative heat exchange device, but was directly discharged externally.

Comparative Example 4

This comparative example provides a device system for sintering flue gas having CO catalytic heat exchange in series with medium/low-temperature SCR denitration, the device system was the same as that in Example 2 except that only the CO heat-regenerative catalyst was arranged (the usage amount of the CO heat-regenerative catalyst was 160 $m^3$), and the heat exchange element was not arranged, and the purified flue gas outlet of the medium/low-temperature SCR denitration reaction device was still connected with the denitrated flue gas inlet of the CO catalytic regenerative heat exchange device.

In Comparative Example 4, the usage amount of CO heat-regenerative catalyst was increased to replace the heat exchange element in Example 2, and the final pressure drop was decreased. However, due to the lower heat exchange efficiency of the CO heat-regenerative catalyst compared with that of the heat exchange element, the usage amount of the blast furnace gas will increase.

Application Example 1

This application example provides a method for sintering flue gas having CO catalytic heat exchange in series with medium/low-temperature SCR denitration, and the method was performed with the device in Example 1, which comprised the following steps:

(1) the sintering flue gas (the flue gas of 240 m² sintering machine, a flow rate of 850000 Nm³/h, a temperature of 100° C., a CO concentration of 8000 mg/m³, a particulate matter concentration of 2 mg/Nm³, a $NO_x$ concentration of 300 mg/Nm³, and a $SO_2$ concentration of 16 mg/Nm³) was subjected to the first CO catalytic conversion by the CO catalytic regenerative heat exchange device, and the sintering flue gas was heated to 250° C., and then introduced into the hot blast furnace device for heat compensation to 280° C. to obtain the heated flue gas;

(2) the heated flue gas was mixed with an ammonia source by the ammonia spray device, and then introduced into a medium/low-temperature SCR denitration reaction device to perform the SCR denitration reaction (the denitration catalyst was $V_2O_5$—$WO_3$/$TiO_2$), and the $NO_x$ in the flue gas reacted with a reducing agent to generate $N_2$ to obtain the denitrated flue gas of 275° C.; and (3) the denitrated flue gas was introduced into the CO catalytic regenerative heat exchange device, and subjected to heat exchange cooling and a second CO catalytic conversion to obtain the purified sintering flue gas of 110° C.;

after a cycle of step (1) to step (3), the CO heat-regenerative catalyst and the heat exchange element that stored heat were transferred around the guide bearing to the sintering flue gas side, i.e., cycling back to step (1), the CO heat-regenerative catalyst and the heat exchange element released heat to raise the temperature of the sintering flue gas;

when the system device was running stably, the heat of the denitrated flue gas was stored in the CO heat-regenerative catalyst and the heat exchange element by the CO catalytic regenerative heat exchange device to transfer to the sintering flue gas, in which case, the fuel feed was stopped, and the hot blast furnace device was shut down; by the CO catalytic regenerative heat exchange device, the first CO catalytic conversion was performed and the temperature of the sintering flue gas can be raised to 280° C.

Application Example 2

This application example provides a method for sintering flue gas having CO catalytic heat exchange in series with medium/low-temperature SCR denitration, and the method was performed with the device in Example 2, which comprised the following steps:

(1) when the device was started, the sintering flue gas (the flue gas of 240 m² sintering machine, a flow rate of 850000 Nm³/h, a temperature of 110° C., a CO concentration of 8000 mg/m³, a particulate matter concentration of 3 mg/Nm³, a $NO_x$ concentration of 280 mg/Nm³, and a $SO_2$ concentration of 18 mg/Nm³) was introduced into the hot blast furnace device and heated to 260° C., then subjected to the first CO catalytic conversion by the CO catalytic regenerative heat exchange device, and the sintering flue gas was heated to 280° C. to obtain the heated flue gas;

(2) the heated flue gas was mixed with an ammonia source by the ammonia spray device, and then passed into a medium/low-temperature SCR denitration reaction device to perform the SCR denitration reaction (the denitration catalyst was $V_2O_5$—$WO_3$/$TiO_2$), and the $NO_x$ in the flue gas reacted with a reducing agent to generate $N_2$ to obtain the denitrated flue gas of 278° C.; and (3) the denitrated flue gas was fed into the CO catalytic regenerative heat exchange device, and subjected to heat exchange cooling and a second CO catalytic conversion to obtain the purified sintering flue gas of 116° C.;

after a cycle of step (1) to step (3), the CO heat-regenerative catalyst and the heat exchange element that store heat were transferred around the guide bearing to the sintering flue gas side, i.e., cycling back to step (1), the CO heat-regenerative catalyst and the heat exchange element released heat to raise the temperature of the sintering flue gas;

when the system device was running stably, the heat of the denitrated flue gas was stored in the CO heat-regenerative catalyst and the heat exchange element by the CO catalytic regenerative heat exchange device to transfer to the sintering flue gas, in which case, the fuel feed was stopped, and the hot blast furnace device was shut down; by the CO catalytic regenerative heat exchange device, the first CO catalytic conversion was performed and the temperature of the sintering flue gas can be raised to 280° C.

Application Example 3

This application example provides a method for sintering flue gas having CO catalytic heat exchange in series with medium/low-temperature SCR denitration. The method was performed with the device in Example 3, the method had the same steps as in Application Example 1, and the difference is only in that the first CO catalytic conversion was performed by the CO catalytic regenerative heat exchange device, and the sintering flue gas was heated to 254° C., the flue gas was heated to 286° C. by the hot blast furnace device with blast furnace gas introduced, and then introduced into the ammonia spray device, the denitrated flue gas of 278° C. was discharged from the medium/plow-temperature SCR denitration reaction device, and the denitrated flue gas was introduced into the CO catalytic regenerative heat exchange device, and was subjected to heat exchange cooling and the second CO catalytic conversion to obtain the purified sintering flue gas with a temperature of 113° C.

Application Example 4

This application example provides a method for sintering flue gas having CO catalytic heat exchange in series with medium/low-temperature SCR denitration. The method was performed on the device in Example 4, the method had the same steps as in Application Example 1, and the difference is only in that the sintering flue gas with a temperature of 80° C. was subjected to the first CO catalytic conversion by the CO catalytic regenerative heat exchange device, and heated to 242° C., then the flue gas was heated to 270° C. by the hot blast furnace device with the blast furnace gas introduced, and then introduced into the ammonia spray device, the denitrated flue gas of 267° C. was discharged from the medium/low-temperature SCR denitration reaction device, and the denitrated flue gas was introduced into the CO catalytic regenerative heat exchange device, and was subjected to heat exchange cooling and the second CO catalytic conversion to obtain the purified sintering flue gas with a temperature of 107° C.

Application Example 5

This application example provides a method for sintering flue gas having CO catalytic heat exchange in series with medium/low-temperature SCR denitration. The method was performed on the device in Example 5, the method had the same steps as in Application Example 1, and the difference was only in that the first CO catalytic conversion was performed by the CO catalytic regenerative heat exchange device, and the sintering flue gas was heated to 252° C., the flue gas was heated to 280° C. by hot blast furnace device with the blast furnace gas introduced, and then introduced into the ammonia spray device.

Application Example 6

This application example provides a method for sintering flue gas having CO catalytic heat exchange in series with medium/low-temperature SCR denitration. The method was performed on the device in Example 1, the method had the same steps as in Application Example 1, and the difference was only in that the sintering flue gas with a temperature of 80° C. was subjected to the first CO catalytic conversion by the CO catalytic regenerative heat exchange device and heated to 242° C., the flue gas was heated to 270° C. by the hot blast furnace device with the blast furnace gas introduced, and then introduced into the ammonia spray device, the denitrated flue gas of 267° C. was discharged from the medium/low-temperature SCR denitration reaction device, and the denitrated flue gas was introduced into the CO catalytic regenerative heat exchange device, and was subjected to heat exchange cooling and the second CO catalytic conversion to obtain the purified sintering flue gas with a temperature of 106° C.

Application Comparative Example 1

This application comparative example provides a method for sintering flue gas having medium/low-temperature SCR denitration. The method was performed with the device in Comparative Example 1, and the method specially comprised the following steps:
(1) the sintering flue gas (the flue gas of 240 m$^2$ sintering machine, a flow rate of 850000 Nm$^3$/h, a temperature of 100° C., a CO concentration of 8000 mg/m$^3$, a particulate matter concentration of 2 mg/Nm$^3$, a NO$_x$ concentration of 300 mg/Nm$^3$, and a SO$_2$ concentration of 16 mg/Nm$^3$) was introduced into a heat exchanger and heated to 250° C., and then introduced into a hot blast furnace device for heat compensation to 280° C. to obtain the heated flue gas;
(2) the heated flue gas was mixed with an ammonia source by the ammonia spray device, and then introduced into the medium/low-temperature SCR denitration reaction device to perform the SCR denitration reaction (the denitration catalyst was V$_2$O$_5$—WO$_3$/TiO$_2$), and the NO$_x$ in the flue gas reacted with a reducing agent to generate N$_2$ to obtain the denitrated flue gas of 275° C.; and
(3) the denitrated flue gas was introduced into a heat exchanger, and subjected to heat exchange cooling to obtain the purified sintering flue gas of 110° C.

In this comparative example, the heat exchange area of the heat exchange element on the raw flue gas side was about 60000 m$^2$, and the heat exchange area of the heat exchange element on the purified flue gas side was about 90000 m$^2$ (estimated based on the flow rate of the sintering flue gas of 850000 Nm$^3$/h), the blast furnace gas was required to be introduced constantly, and the operation cost was high.

Application Comparative Example 2

This application comparative example provides a method for sintering flue gas having CO catalytic heat exchange in series with medium/low-temperature SCR denitration. The method was performed with the device in Comparative Example 2, and the method differed from Application Example 1 only in that the sintering flue gas was first subjected to heat exchange by the heat exchanger, and then subjected to the first CO catalytic conversion by the CO catalytic device and the sintering flue gas was heated to 232° C., and then the flue gas was heat to 280° C. by the hot blast furnace device with the blast furnace gas introduced, and then introduced into the ammonia spray device, the denitrated flue gas at 275° C. was discharged from the medium/low-temperature SCR denitration reaction device, and the denitrated flue gas was introduced into the CO catalytic regenerative heat exchange device, and subjected to heat exchange cooling and the second CO catalytic conversion to obtain the purified sintering flue gas with a temperature of 111° C. In this comparative example, constant heat compensation by the blast furnace gas was not required.

Application Comparative Example 3

This application comparative example provides a method for sintering flue gas having CO catalytic heat exchange in series with medium/low-temperature SCR denitration. The method was performed on the device in Comparative Example 3, and the others were the same as in Application Example 1, which specifically comprised:
(1) the sintering flue gas (the flue gas of 240 m$^2$ sintering machine, a flow rate of 850000 Nm$^3$/h, a temperature of 100° C., a CO concentration of 8000 mg/m$^3$, a particulate matter concentration of 2 mg/Nm$^3$, a NO$_x$ concentration of 300 mg/Nm$^3$, and a SO$_2$ concentration of 16 mg/Nm$^3$) was heated to 230° C. by a hot blast furnace device, and then introduced into a CO catalytic device, and the sintering flue gas was heated to 280° C. by the heat release from catalytic oxidation; and
(2) the heated flue gas was mixed with an ammonia source by the ammonia spray device, and then introduced into the medium/low-temperature SCR denitration reaction device to perform the SCR denitration reaction (the denitration catalyst was V$_2$O$_5$—WO$_3$/TiO$_2$), and the NO$_x$ in the flue gas reacted with a reducing agent to generate N$_2$ to obtain the denitrated flue gas at 275° C.

In this comparative example, the raw flue gas and the purified flue gas were not subjected to heat exchange, and the blast furnace gas was required to be introduced constantly for heat compensation to raise the temperature to reach the CO catalytic reaction temperature, and the system pressure drop was small, but the operation cost was high.

The NO$_x$ concentration and the CO concentration in the purified flue gas were detected with the infrared flue gas analyzer, the system pressure drop was evaluated by the pressure gauges before and after the system, and the fuel consumption in the hot blast furnace device for 30 days of operation was calculated by the flow rate of the blast furnace gas. The results are shown in Table 1.

TABLE 1

|  | NO$_x$ concentration in purified flue gas | CO concentration in purified flue gas | Total pressure drop in the system | Blast furnace gas consumption (30 days) |
|---|---|---|---|---|
| Application Example 1 | 28 mg/m$^3$ | 420 mg/m$^3$ | 1700 Pa | 30000 m$^3$ |
| Application Example 2 | 29 mg/m$^3$ | 460 mg/m$^3$ | 1720 Pa | 40000 m$^3$ |
| Application Example 3 | 32 mg/m$^3$ | 360 mg/m$^3$ | 1680 Pa | 36000 m$^3$ |
| Application Example 4 | 38 mg/m$^3$ | 320 mg/m$^3$ | 1850 Pa | 50000 m$^3$ |
| Application Example 5 | 27 mg/m$^3$ | 260 mg/m$^3$ | 2100 Pa | 28000 m$^3$ |
| Application Example 6 | 40 mg/m$^3$ | 520 mg/m$^3$ | 1730 Pa | 39000 m$^3$ |
| Application Comparative Example 1 | 36 mg/m$^3$ | 8000 mg/m$^3$ | 2250 Pa | 8000000 m$^3$ |
| Application Comparative Example 2 | 34 mg/m$^3$ | 800 mg/m$^3$ | 2380 Pa | 200000 m$^3$ |
| Application Comparative Example 3 | 35 mg/m$^3$ | 400 mg/m$^3$ | 600 Pa | 24000000 m$^3$ |

From the data in Table (1), the following points can be found:

(1) by analyzing Application Examples 1-4, it can be seen that the pressure drop of the method for sintering flue gas having CO catalytic heat exchange in series with medium/low-temperature SCR denitration provided in the present application is low; for the flue gas flow rate of 850000 Nm$^3$/h, the total pressure drop of the system is only less than or equal to 1900 Pa, and the consumption of blast furnace gas is low, which is less than or equal to 50000 m$^3$ in 30 days, the result of denitration and CO removal are excellent, wherein the NO$_x$ concentration in the purified flue gas is less than or equal to 40 mg/m$^3$, and the CO concentration in the purified flue gas is less than or equal to 500 mg/m$^3$;

(2) by analyzing Application Example 1 and Application Example 5, it can be seen that the porosity of the cordierite honeycomb ceramic heat-regenerative framework in Application Example 1 is 0.6, while the porosity is 0.3 in Application Example 5, and in Application Example 5, the pressure drop increases significantly to 2100 Pa, and the denitration efficiency is not significantly optimized, resulting in a significant increase in the system operation cost; it is shown that in the present application, the porosity of the cordierite honeycomb ceramic heat-regenerative framework is preferably controlled within a specific range, which can better ensure the efficiency of denitration and CO removal while reducing the system pressure drop and the cost;

(3) by analyzing Application Example 1 and Application Comparative Example 1, it can be seen that in order to achieve the same heat exchange result in Application Example 1, the area of the heat exchange element is required to be significantly increased in Application Comparative Example 1, resulting in a significant increase in the pressure drop to 2250 Pa, the overall system no longer has the efficiency of CO removal, and the blast furnace gas consumption is as high as 8000000 m$^3$/30 days, which shows that in the present application, the pressure drop and the blast furnace gas consumption are significantly reduced by adopting the CO catalytic regenerative heat exchange device with a heat storage function;

(4) by analyzing Application Example 1 and Application Comparative Example 2, it can be seen that only one CO catalytic oxidation device is added on the basis of the original heat exchanger, resulting in a significant increase in the system pressure drop, and the required blast furnace gas consumption is still high; and (5) by analyzing Application Example 1 and Application Comparative Example 3, it can be seen that in Application Comparative Example 3, only the CO heat-regenerative catalyst is provided, the pressure drop decreases, but the purified flue gas outlet is no connected to the CO catalytic heat-regenerative device, so that the blast furnace gas is continuously operated and has a huge consumption. Moreover, the flue gas does not undergo two times of CO catalysis; the catalytic efficiency on CO is reduced.

The detailed structural features in the present application are illustrated by the above examples in the present application, but the present application is not limited to the above detailed structural features, that is, the present application does not necessarily rely on the above detailed structural features to be implemented. Those skilled in the art should understand that any improvement of the present application, the equivalent substitution of selected parts, the addition of auxiliary ingredients, and the selection of specific methods in the present application shall fall within the protection scope and disclosure scope of the present application.

What is claimed is:

1. A method for sintering flue gas having CO catalytic heat exchange in series with medium/low-temperature SCR denitration, which is performed with a device system for sintering flue gas having CO catalytic heat exchange in series with medium/low-temperature SCR denitration;
- the device system comprises a CO catalytic regenerative heat exchange device, an ammonia spray device, and a medium/low-temperature SCR denitration reaction device which are sequentially connected along the flow direction of raw flue gas;
- a sintering flue gas inlet of the CO catalytic regenerative heat exchange device is directly connected to a desulfurized raw flue gas pipeline;
- a purified flue gas outlet of the medium/low-temperature SCR denitration reaction device is connected to a denitrated flue gas inlet of the CO catalytic regenerative heat exchange device;
- a CO heat-regenerative catalyst comprises a cordierite honeycomb ceramic heat-regenerative framework and an active component which is arranged on the cordierite honeycomb ceramic heat-regenerative framework
- the cordierite honeycomb ceramic heat-regenerative framework has a porosity of 0.5-0.7;
- the method comprises the following steps:
  - (1) subjecting sintering flue gas to the CO catalytic regenerative heat exchange device to perform a first CO catalytic conversion and heat the sintering flue gas to obtain heated flue gas;
  - (2) mixing the heated flue gas with an ammonia source by the ammonia spray device, and then introducing into the medium/low-temperature SCR denitration reaction device to perform an SCR denitration reaction to obtain denitrated flue gas; a temperature of the heated flue gas which is introduced into the ammonia spray device in step (2) is 220-280° C., and a complete reaction temperature of the CO heat-regenerative catalyst in the CO catalytic regenerative heat exchange device is 180-220° C.; and
  - (3) introducing the denitrated flue gas into the CO catalytic regenerative heat exchange device to perform heat exchange cooling and a second CO catalytic conversion to obtain purified sintering flue gas;
- using heat release from CO catalytic oxidation to replace heat supplement of hot blast furnace fuel and a heat exchanger device;
- wherein at the stage where the process of step (1) is being started up, the heated flue gas is subjected a hot blast furnace device for heat supplement before introduced to the ammonia spray device;
- for the flue gas with a flow rate of 850000 $Nm^3/h$, the total system pressure drop is less than or equal to 1900 Pa; the consumption of blast furnace gas is less than or equal to 50000 $m^3$ in 30 days; the $NO_x$ concentration in the purified flue gas is less than or equal to 40 $mg/m^3$, and the CO concentration in the purified flue gas is less than or equal to 500 $mg/m^3$.

2. The method according to claim 1, wherein the CO catalytic regenerative heat exchange device comprises a heat exchange device shell, and the CO heat-regenerative catalyst and a heat exchange element which are provided inside the heat exchange device shell;
- a guide bearing inside a central axis of the CO catalytic regenerative heat exchange device, and the CO heat-regenerative catalyst and the heat exchange element are allowed to rotate around the guide bearing.

3. The method according to claim 2, wherein the heat exchange element is arranged lower than the CO heat-regenerative catalyst.

4. The method according to claim 1, wherein an SCR denitration catalyst is arranged in the medium/low-temperature SCR denitration reaction device.

5. The method according to claim 1, wherein a CO concentration in the sintering flue gas is 6000-12000 $mg/Nm^3$.

6. The method according to claim 5, wherein the CO concentration in the sintering flue gas is 8000-12000 $mg/Nm^3$.

7. The method according to claim 1, wherein a catalyst for the SCR denitration reaction in step (2) comprises a vanadium-tungsten-titanium catalyst and/or a vanadium-molybdenum-titanium catalyst.

8. The method according to claim 1, wherein a catalyst for the SCR denitration reaction in step (2) is $V_2O_5$—$WO_3$/$TiO_2$ and/or $V_2O_5$—$MoO_3$/$TiO_2$.

* * * * *